(12) United States Patent
Aibara et al.

(10) Patent No.: US 6,841,770 B2
(45) Date of Patent: Jan. 11, 2005

(54) SEMICONDUCTOR INTEGRATED CIRCUIT DEVICE AND IMAGING SYSTEM

(75) Inventors: Yasutoshi Aibara, Takasaki (JP); Hiroki Nakajima, Maebashi (JP); Eiki Imaizumi, Kodaira (JP); Tatsuji Matsuura, Tokyo (JP)

(73) Assignees: Renesas Technology Corp., Tokyo (JP); Hitachi ULSI Systems Co., Ltd., Tokyo (JP); Hitachi Tohbu Semiconductor, Ltd, Gunma (JP)

( * ) Notice: Subject to any disclaimer, the term of this patent is extended or adjusted under 35 U.S.C. 154(b) by 0 days.

(21) Appl. No.: 10/817,042

(22) Filed: Apr. 5, 2004

(65) Prior Publication Data

US 2004/0182992 A1 Sep. 23, 2004

Related U.S. Application Data

(63) Continuation of application No. 10/080,586, filed on Feb. 25, 2002, now Pat. No. 6,781,107.

(51) Int. Cl.$^7$ .............................................. H04N 5/335
(52) U.S. Cl. ..................... 250/208.1; 348/272; 382/167
(58) Field of Search ............................. 250/208.1, 226; 348/272, 273; 382/162–167

(56) References Cited

U.S. PATENT DOCUMENTS

| | | | |
|---|---|---|---|
| 5,020,118 A | 5/1991 | Sugiura | 382/50 |
| 5,309,183 A | 5/1994 | Sasaki et al. | 348/233 |
| 5,748,235 A | 5/1998 | Kondo et al. | 348/222 |
| 5,867,285 A | 2/1999 | Hirota et al. | 358/522 |
| 6,081,254 A | 6/2000 | Tanaka et al. | 345/154 |
| 6,192,146 B1 | 2/2001 | Abe | 382/165 |
| 6,515,698 B1 | 2/2003 | Sasaki et al. | 348/231.6 |

*Primary Examiner*—Stephone B. Allen
(74) *Attorney, Agent, or Firm*—Miles & Stockbridge P.C.

(57) ABSTRACT

An AD-converted digital video data is encoded by a difference encoding method before it is outputted and such encoded digital video data is then outputted, after it is converted to gray code or to a predetermined code in which a fixed value is added. Problems solved include noise that is generated when the AD conversion circuit outputs video data and that migrates into a CCD side via a power supply line on a printed circuit board, and noise that appears on a display image by migration into an input terminal side from an output circuit side via the power supply line and a semiconductor substrate within an AD conversion LSI.

20 Claims, 8 Drawing Sheets

| | | (A) | (B) | (C) | (D) | (E) | (F) | (G) | (H) |
|---|---|---|---|---|---|---|---|---|---|
| KIND OF COLOR | | R | G | R | G | R | G | R | G |
| DECIMAL NUMBERS | | 200 | 100 | 200 | 100 | 202 | 101 | 200 | 100 |
| OUTPUT CODE IN THE EXISTING SYSTEM | BINARY CODE | 11001000 | 01100100 | 11001000 | 01100100 | 11001010 | 01100101 | 11001000 | 01100100 |
| | NUMBER OF CHANGE-OVER BITS | — | 4 | 4 | 4 | 5 | 6 | 5 | 4 |
| | DIFFERENTIAL DECIMAL NUMBER | 200 (INITIAL DATA) | 100 (INITIAL DATA) | 0 (DIFFERENCE) | 0 (DIFFERENCE) | 2 (DIFFERENCE) | 1 (DIFFERENCE) | 254 (−2) (DIFFERENCE) | 255 (−1) (DIFFERENCE) |
| OUTPUT CODE IN THIS SYSTEM | BINARY CODE | 11001000 | 01100100 | 00000000 | 00000000 | 00000010 | 00000001 | 11111110 | 11111111 |
| | GRAY CODE | 01011000 | 10101100 | 00000000 | 00000000 | 00000011 | 00000001 | 10000001 | 10000000 |
| | NUMBER OF CHANGE-OVER BITS | — | 4 | 4 | 0 | 2 | 1 | 1 | 1 |

SEMICONDUCTOR INTEGRATED CIRCUIT DEVICE AND IMAGING SYSTEM

CROSS-REFERENCE TO RELATED APPLICATION

This application is a continuation of application Ser. No. 10/080,586 filed Feb. 25, 2002 now U.S. Pat. No. 6,781,107.

BACKGROUND OF THE INVENTION

The present invention relates to a noise reduction technique in an imaging system utilizing an imaging element such as a CCD (charge coupled device) and more specifically to a technique for reducing noise generated by transmission of digital image data with a code conversion system, for example a technique which can effectively be adapted to an electronic still camera (a so-called digital camera) and a video camera.

Figure 10:
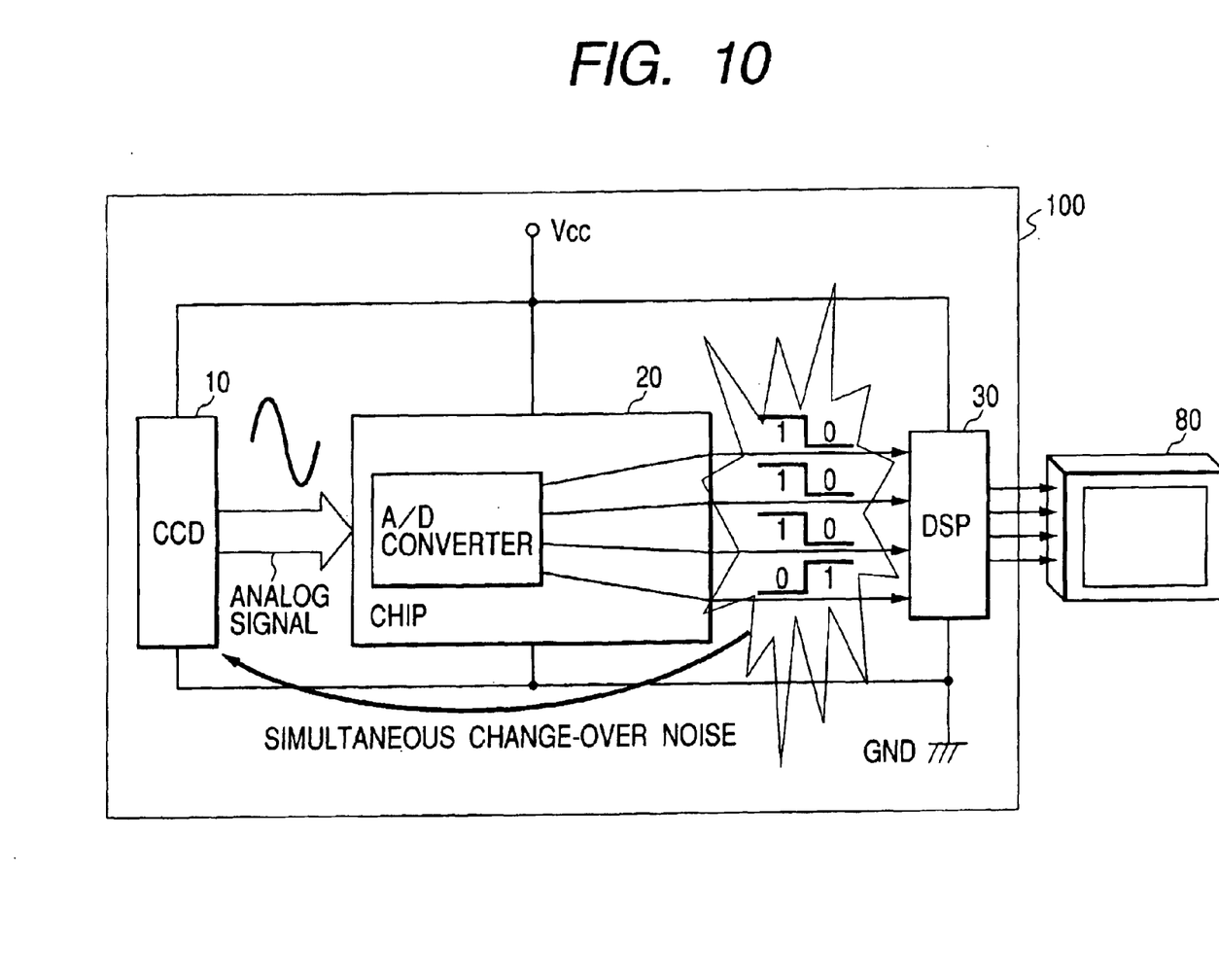
FIG. 10 is a block diagram showing an example of schematic construction of an ordinary imaging system.

As shown in FIG. 10, there is provided an imaging system such as an electronic still camera or a video camera in which an analog video signal outputted from a CCD 10 is converted into a digital signal in an LSI (large scale semiconductor integrated circuit) for AD conversion 20, this video signal is processed in a DSP (digital signal processor) 30 and the signal is then displayed on a display 80. The CCD 10 and DSP 30 are also packed respectively in a semiconductor integrated circuit like the LSI for AD conversion 20, and these semiconductor integrated circuits are mounted on a printed wiring substrate 100 to form an imaging system.

SUMMARY OF THE INVENTION

The inventors of the present invention have investigated in detail the cause of noise appearing on a display image of such an imaging system. As a result, the inventors have found the major causes in that power supply noise generated at the time of outputting video data from the AD conversion LSI 20 in order to transmit the AD-converted video data to the DSP 30 migrates into the CCD side via the power supply line (Vcc line and ground line) on the printed wiring substrate and thereafter appears on the video signal to be inputted to the AD conversion LSI, and that such power supply noise migrates into the input terminal side from the output circuit side through the power supply and semiconductor substrate within the AD conversion LSI.

Since an output circuit of LSI may drive a load such as external printed wiring which is larger than a load within a chip, an output element used is also large in size (10 times or more) in comparison with the elements forming the internal circuit, such as the AD conversion circuit, and therefore the circuit is usually designed to allow a comparatively large amount of current to flow. Therefore, it is thought that noise appears on the power supply because a large current flows when an output signal is changed over. Moreover, noise generated in the output circuit is also propagated to an internal circuit other than the input circuit via the substrate, but since the AD conversion LSI includes an amplifying circuit such as a PGA (programmable gain amplifier) for amplifying an input analog signal, the noise propagated to the input side is also amplified together with the video signal, and thereby display quality may be deteriorated.

Therefore, the inventors have attempted, in order to reduce noise resulting from operations of the output circuit, connection of a bypass capacitor having a comparatively large capacity to the power supply terminal of the AD conversion LSI as a measure to reduce the noise. However, it has been proved that providing a large bypass capacitor results in increase of a chip size and causes reduction of system loading efficiency and moreover, providing only the bypass capacitor cannot remove the noise sufficiently.

Therefore, the inventors have reached the conclusion that it is very effective for reduction of noise to reduce a through-current in the output circuit resulting from the change-over of digital video data outputted from the AD conversion LSI 20. One way to reduce the through-current in the output circuit is to lower the power supply voltage and lower a driving power of the output circuit. However, in this case, the transmission rate of the signal is lowered and thereby performance of the system can no longer be satisfied.

Therefore, it is an object of the present invention to provide a semiconductor integrated circuit which can reduce a through-current flowing into an output circuit when an output is changed over and thereby reduce noise appearing in the output circuit.

Another object of the present invention is to provide an imaging system which can improve image quality by reducing noise generated in an output circuit which converts an analog video signal outputted from a solid state imaging element such as CCD, into digital video data, and which then outputs such digital video data, without lowering the transmission rate of the signal.

The aforementioned and other objects and novel features of the present invention will become apparent from the description of this specification and the accompanying drawings.

An outline of the typical inventions disclosed in this specification will be explained as follows.

Namely, the AD-converted digital video data is encoded by a differential encoding method before it is outputted and such encoded signal is then outputted after conversion to gray code or conversion to a predetermined code through addition of a certain fixed value. In more practical terms, after an analog color video signal outputted from an imaging element is AD-converted in the AD conversion circuit, a difference between the codes of adjacent pixels is obtained in regard to the same color after the AD conversion and an output code of this difference process is then converted into a code with less change-over bits between the adjacent codes. Through such code conversion, the number of bits changing when the output digital signal is changed over is lowered, thereby a through-current in the output circuit is reduced and noise due to change of output can be lowered.

Moreover, the present invention comprises an amplifying circuit for amplifying an analog color video signal outputted from an imaging element, an AD conversion circuit for converting the amplified signal into a digital signal, a differential means for obtaining a difference of the codes of adjacent pixels in regard to the same color after the AD conversion, and a code conversion means for code conversion of an output of the differential means. Thereby, the number of bits changing when a digital signal output from a semiconductor integrated circuit changes is reduced, and thereby a through-current in an output circuit can also be reduced.

As the code converting means, it is preferable to use a binary gray code converting circuit for changing the input binary code into the gray code. Thereby, the number of bits which change when the output digital signal is changed over can surely be reduced.

Moreover, as the code converting means, it is also possible to use a circuit for adding a fixed value to the input code or subtracting a fixed value from the input code. Thereby, the number of bits changing when the output digital signal is changed over can be reduced considerably. The reason is based on the following principle. That is, the differential element of the digital video data is concentrated to the data near zero such as 0, +1, −1 or the like. Therefore, the data becomes all "0" in the binary code, but since −1 is all "1", when the differential data changes to −1 from 0 or vice versa, all bits change and thereby noise is generated. Therefore, generation of changes to all "1" from all "0" or vice versa is prevented by adding a fixed value to the input code or subtracting a fixed value from the input code.

Moreover, the differential means explained above is constructed by a delay circuit for delaying an output code of the AD conversion circuit and a subtraction means for obtaining the difference between the code delayed with the delay circuit and the input code, and the delay circuit changing the delay time depending on color arrangement of the input video signal. Thereby, even if the color arrangement of a filter used is different, it may be easily covered by changing a delay time of the delay circuit.

Moreover, the imaging system of the present invention is constructed by an imaging element being provided with a color filter, an amplifying circuit for amplifying an analog color video signal outputted from the imaging element, an AD conversion circuit for converting the amplified signal into a digital signal, a differential means for obtaining a difference between codes of adjacent pixels in regard to the same color after the AD conversion, a semiconductor integrated circuit being provided with a first code converting means for code conversion of an output of the differential means and a semiconductor integrated circuit for image processing being provided with a second code converting means for converting the code outputted from the semiconductor integrated circuit and an image processing circuit.

According to the means explained above, a through-current in the output circuit of the semiconductor integrated circuit provided with the AD conversion circuit can be reduced, and noise resulting from change of output can also be controlled, and as a result, display quality can be improved.

It is preferable that the first code conversion means uses a binary gray code conversion circuit for converting a binary code to the gray code, while the second code conversion means uses a gray binary code conversion circuit for converting the gray code to the binary code. Thereby, the number of bits which change whenever the output digital signal is changed over can be surely reduced and the display quality can be improved.

Moreover, it is also possible to use a circuit for adding a fixed value to the input code or subtracting a fixed value from the input code as the code conversion means explained above. Accordingly, the number of bits which change when the output digital signal is changed over can be reduced considerably and the display quality can also be improved.

Moreover, the differential means is constructed by a delay circuit for delaying an output code of the AD conversion circuit and a subtraction circuit for obtaining a difference between the code delayed by the delay circuit and the input code, while the delay circuit is constructed to change a delay time depending on the color arrangement of the input video signal. Thereby, even if the color arrangement of the filter used is different, it can be covered easily by changing a delay time of the delay circuit.

Moreover, in the construction of the present invention, a storage means is provided for storing digital video data, the semiconductor integrated circuit for image processing explained above is provided with a data compression circuit for compressing the code converted by the second code converting means and a data expanding circuit for expanding the compressed data and the data compressed by the data compression circuit is stored in the storage means explained above. Thereby, many video data can be stored in storage means of small storing capacity while video data compatibility is assured.

DETAILED DESCRIPTION OF THE PREFERRED EMBODIMENTS

The preferred embodiments of the present invention will be explained with reference to the accompanying drawings.

Figure 1:
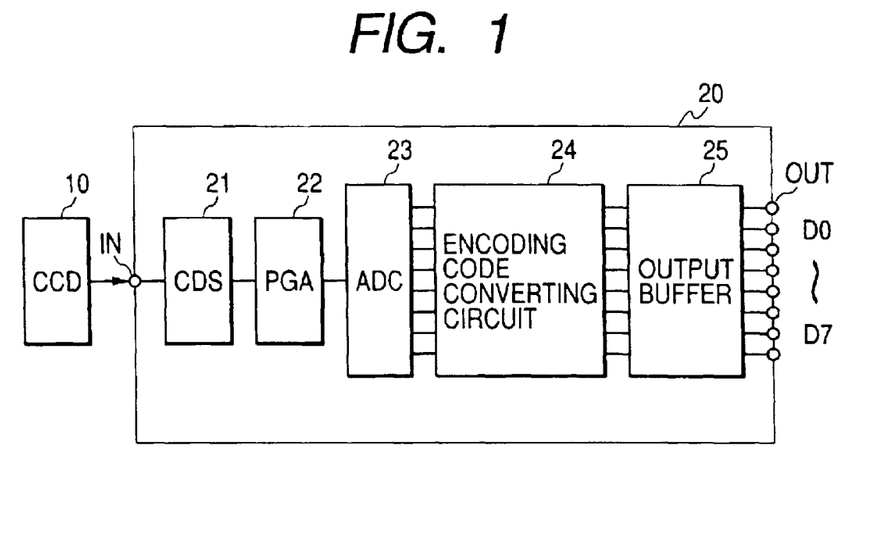
FIG. 1 is a block diagram showing an example of schematic construction of an AD conversion LSI to be used for the imaging system to which the present invention is adapted.

FIG. 1 shows an example of the schematic construction of the AD conversion LSI to be used for the imaging system to which the present invention is adapted.

As shown in FIG. 1, the AD conversion LSI 20 of the preferred embodiment is composed of a correlation double sampling circuit (CDS) 21 for sampling an analog video signal which is outputted from a CCD 10 and is then inputted to an input terminal IN, a programmable gain amplifier (PGA) 22 which can vary the gain for amplifying the sampled signal, an AD conversion circuit (ADC) 23 for converting the amplified analog signal into a digital signal, an encoding & code converting circuit 24 for differentially encoding the AD-converted digital video data and then converting such signal to the gray code and an output buffer 25 for outputting the code-converted signal externally of an LSI chip from an output terminal OUT.

Of the circuit blocks 21 to 25 forming the AD conversion LSI 20, other circuits except for the encoding & code converting circuit 24 are also provided in the existing AD conversion LSI 20. Namely, it is the characteristic property of the present invention that the encoding & code converting circuit 24 is provided between the AD conversion circuit 23 and output buffer 25.

Although, not illustrated in FIG. 1, an LSI chip may include a control circuit for generating a signal to control the gain of the amplifier (PGA) 22 and controlling total operations of the chip, a clock generation circuit for generating a clock signal to give the sampling timing to the CDS 21 and also generating the clock signal required respectively for the operations of the AD conversion circuit 23 and the encoding & code decoding circuit 24 and a block buffer for distributing the clock signal supplied from the external circuits to the circuits within the chip.

Moreover, in this embodiment, noise can be reduced by reducing a through-current in the output buffer 25 as will be explained later by providing the encoding & code decoding circuit 24, but it is preferable to connect a bypass capacitor to the power supply terminal of the chip in view of further reducing noise. However, since a bypass capacitor having a smaller capacitance value may be used by applying the present invention, the loading area can be reduced.

Figure 2:
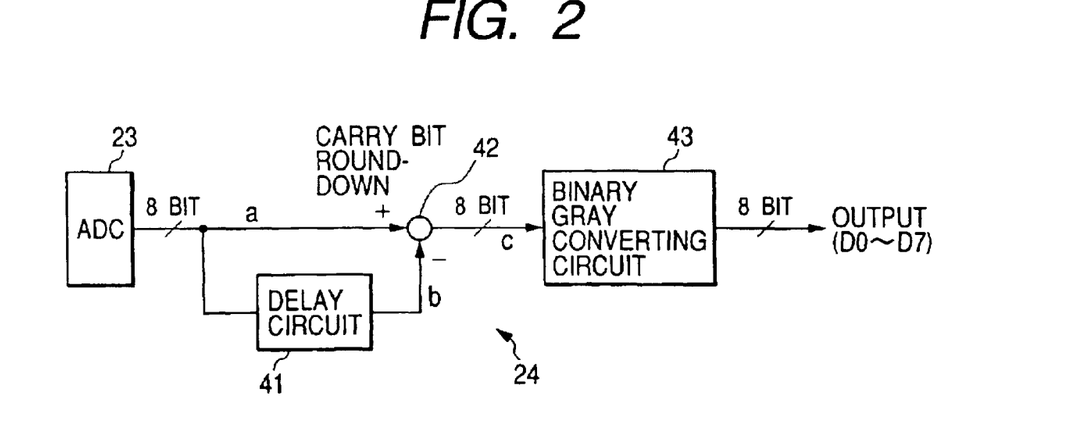
FIG. 2 is a block diagram showing an example of schematic construction of an encoding & code converting circuit.

FIG. 2 shows a schematic construction of the encoding & code decoding circuit 24. As shown in FIG. 2, the encoding & code decoding circuit 24 is composed of a delay circuit 41 for delaying the data outputted from the AD conversion circuit 23 as much as the predetermined clock period, a difference encoding circuit 42 for obtaining a difference between the data outputted from the AD conversion circuit 23 and the data delayed by the delay circuit 41, and a code conversion circuit 43 for converting the differentially encoded binary data into the gray code.

The difference encoding circuit 42 rounds down a carry bit which is formed, e.g., rounds down the carry bit which is generated when a difference is obtained. Thereby, the number of bits of data before a difference is obtained becomes identical to the number of bits of data after a difference is obtained and thereby data can be processed more easily. The Table 1 shows the result of arithmetic operations when a carry is rounded down by obtaining a difference between the data (value a from which the subtraction is carried out) and the data (subtraction value b) in an example of 2 bits, and the result d (=c+b) to obtain the value a from which the subtraction is carried out by addition from the result of calculation c and subtraction value b. In this embodiment, the carry bit generated is rounded down even in the addition which is carried out at the time of difference decoding explained later. Accordingly, the number of bits of the data before obtaining a difference becomes identical to the number of bits of data after obtaining a difference.

TABLE 1

| Value a | Value b | c (=a − b) Carry round-down | d (=c + b) Carry round-down |
|---|---|---|---|
| 00 | 00 | 00 | 00 |
| 00 | 01 | 11 | 00 |
| 00 | 10 | 10 | 00 |
| 00 | 11 | 01 | 00 |
| 01 | 00 | 01 | 01 |
| 01 | 01 | 00 | 01 |
| 01 | 10 | 11 | 01 |
| 01 | 11 | 10 | 01 |
| 10 | 00 | 10 | 10 |
| 10 | 01 | 01 | 10 |

TABLE 1-continued

| Value a | Value b | c (=a − b) Carry round-down | d (=c + b) Carry round-down |
|---|---|---|---|
| 10 | 10 | 00 | 10 |
| 10 | 11 | 11 | 10 |
| 11 | 00 | 11 | 11 |
| 11 | 01 | 10 | 11 |
| 11 | 10 | 01 | 11 |
| 11 | 11 | 00 | 11 |

In the Table 1, the code (a) of the first column is identical to the code (d) of the fourth column. From this fact, it can be understood that the original code can be recovered accurately by executing the round-down of the carry respectively at the time of the difference encoding and difference decoding. An example of the 2-bit code is shown in the Table 1, but reproducibility can be attained even when the carry is rounded down in the same manner in the code of three or more bits.

Figure 3:
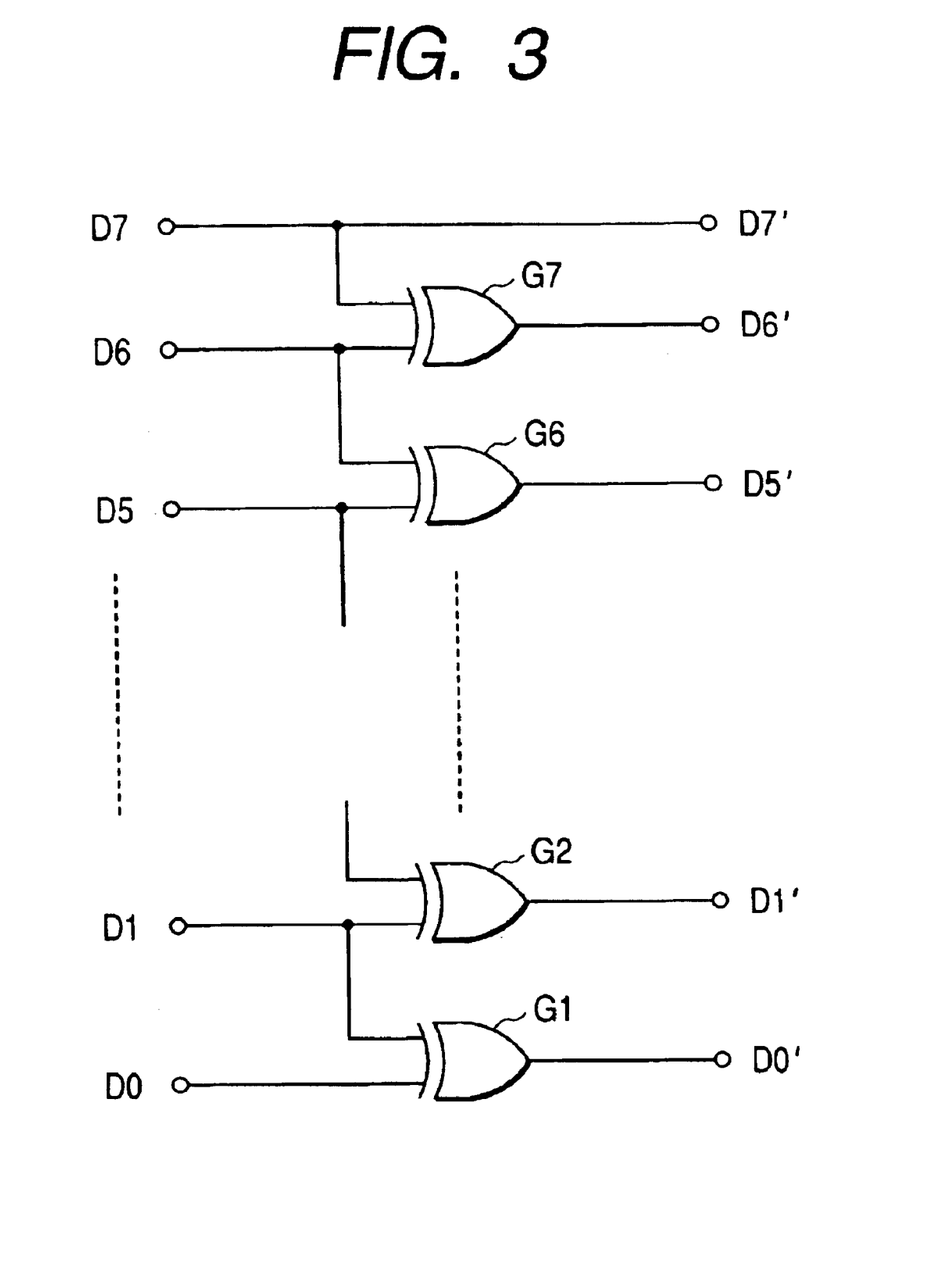
FIG. 3 is a block diagram showing an example of construction of a binary gray conversion circuit.

The code conversion circuit 43 is constructed, for example, by exclusive OR gates G1 to G7 in such a number which is smaller by one than the number of bits of the code to be converted, for example, as shown in FIG. 3, and this circuit 43 outputs an exclusive OR of the adjacent bits Di, Di+1 (i=0 to 6) except for the most significant bit as the bit "Di" after the code conversion. The most significant bit D7 before the code conversion is outputted directly as the most significant bit D7' after the code conversion. FIG. 3 shows an example of the circuit for conversion example of the binary code of 8 bits to the gray code. The code conversion circuit for the desired number of bits such as 10 bits and 12 bits, etc. can be constructed in the same manner.

Figure 4A:
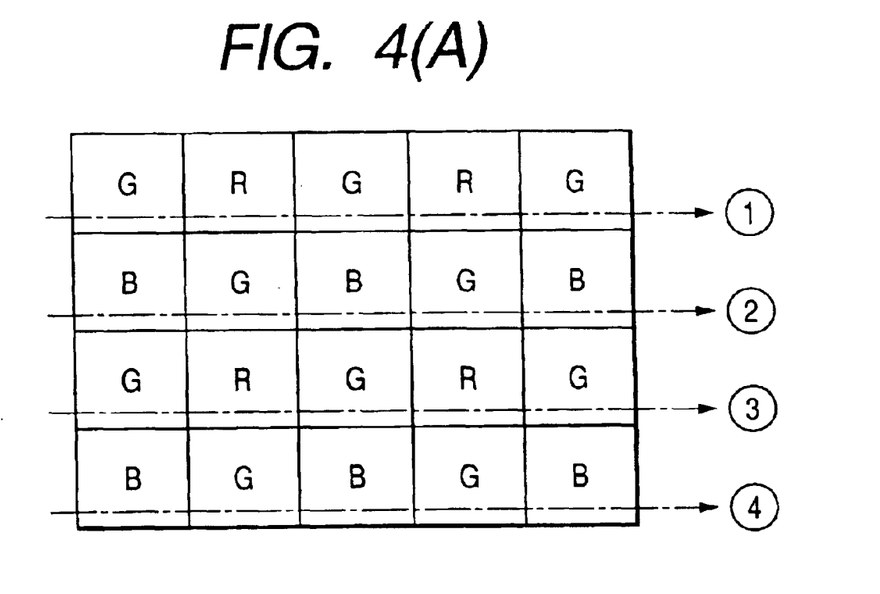
FIGS. 4(A) and 4(B) are layout diagrams showing examples of construction of a filter used for an electronic camera.

Next, practical procedures of the difference encoding process by the difference encoding circuit 42 and binary gray code conversion by the code conversion circuit 43 will be explained with reference to FIG. 5. The procedures explained here correspond to the case where the video signal is outputted from a CCD which includes a color filter in which the three primary colors R (red), G (green) and B (blue) are arranged as shown in FIG. 4(A) and is constructed to sequentially scan each line shown by the arrow marks ① to ④ in FIG. 4(A) from the upper side in the horizontal direction. In this case, the amount of delay in the delay circuit 41 of FIG. 2 is defined as the amount of delay of two clock periods, namely two clock periods of the sampling clock of the input signal in the CDS 21.

Figure 5:
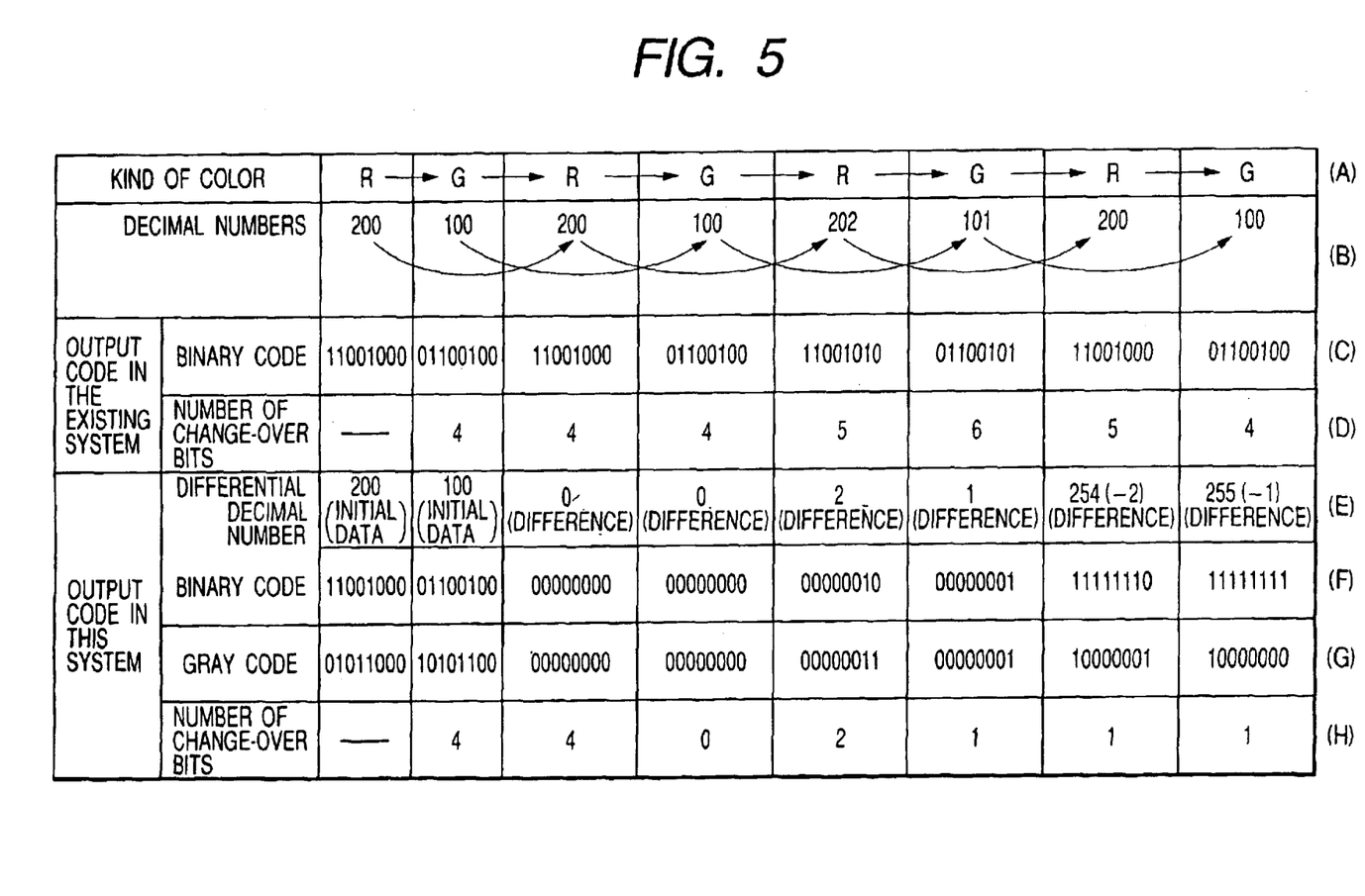
FIG. 5 is an explanatory diagram of code conversion showing a practical example of differential encoding and binary gray conversion in the AD conversion circuit of a preferred embodiment.

Here, it is assumed that the signals of R (red) and G (green) are alternately inputted such as R→G→R→G→R→G→R→G as indicated in the row (A) of FIG. 5. In this case, it is also assumed that a value obtained by AD conversion of each signal is changed to the value in the row (B) of FIG. 5 in the decimal number. Such value can be expressed with the binary code which is actually outputted as shown in the row (C) of FIG. 5. This code has been outputted directly from the existing AD conversion LSI not including the encoding & code converting circuit 24. As will be apparent from the comparison of the adjacent codes in the row (C) of FIG. 5, the number of change-over bits when each code is changed to the next code can be expressed with the code in the row (D) of FIG. 5.

The values outputted from the difference encoding circuit 42 when the binary code as shown in row (C) of FIG. 5 is inputted to the code conversion circuit 24 of this embodiment can be expressed in the decimal number as shown in row (E) of FIG. 5 or expressed in the binary code as shown in row (F) of FIG. 5. Here, the difference means a difference between the same colors of adjacent pixels, namely a difference between every other value as shown by the arrow marks in the row (B) of FIG. 5. The difference binary code of row (F) can be converted to the gray code as shown in row (G).

As will be apparent from comparison between the adjacent codes in the row (G) of FIG. 5, the number of change-over bits when each code is changed to the next code is shown in row (H). Comparison between the rows (D) and (H) of FIG. 5 will make it apparent that the number of change-over bits is remarkably reduced in this embodiment from that of the existing system.

Figure 4B:
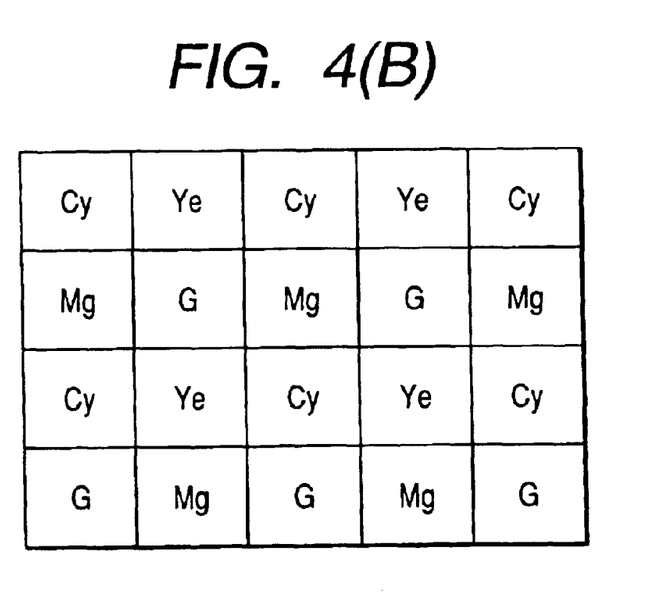

Since distinctive change between the adjacent pixels is small in the video signal, amount of change in the bits of the same colors is also small even when the code after the AD conversion is immediately converted to the gray code. In this embodiment, the code after the AD conversion is not immediately converted to the gray code and only a difference is obtained because a code difference between different colors of one pixel in an output of the CCD having passed the filter in the color element arrangement as shown in FIG. 4 is comparatively large even when change between the adjacent pixels is rather small in the video signal (only exception is that difference of codes between different colors is also small in the case of gray color in which the imaging object is poor in change of color).

When the code is converted to the gray code by obtaining a difference as in the case of this embodiment, since there is no large difference between the differences even when the color is different, the number of bits is also reduced when an output of the video data of the R (red) element is changed over, for example, to the output of the video data of the G (green) element.

However, if only a difference is obtained, the events in which a difference becomes positive or negative in one display image are assumed to be generated almost in the same rate but the code is changed to a large extent to all "1" from all "0" when the binary code expressed with the 2's complement is changed to negative from positive or to all "0" from all "1" when such binary code is changed to positive from negative. Therefore, in this embodiment, the code does not change to a large extent for change to negative from positive or change to positive from negative by converting the binary code to the gray code.

Table 2 shows an example of the relationship between the binary code expressed with the 2's complement and the gray code when the code is formed of three bits.

TABLE 2

| Decimal | Binary (2's complement) | Gray code | Offset binary (+5) |
|---|---|---|---|
| 7 | 111 | 100 | 100 |
| 6 | 110 | 101 | 011 |
| 5 | 101 | 111 | 010 |
| 4 | 100 | 110 | 001 |
| 3 | 011 | 010 | 000 |
| 2 | 010 | 011 | 111 |
| 1 | 001 | 001 | 110 |
| 0 | 000 | 000 | 101 |
| −1 (7) | 111 | 100 | 100 |
| −2 (6) | 110 | 101 | 011 |
| −3 (5) | 101 | 111 | 010 |
| −4 (4) | 100 | 110 | 001 |
| −5 (3) | 011 | 010 | 000 |

TABLE 2-continued

| Decimal | Binary (2's complement) | Gray code | Offset binary (+5) |
|---|---|---|---|
| −6 (2) | 010 | 011 | 111 |
| −7 (1) | 001 | 001 | 110 |

As will be understood from the Table 2, when the decimal number changes to "−1" from "0", the binary code of three bits changes to "111" from "000". Moreover, in the case of the code of 4 bits, 8 bits or more bits, the codes change to all "0" from all "1". In this case, all bits (three bits) are changed over. On the other hand, when the decimal number changes to "−1" from "0", the gray code, for example, of three bits changes to "100" from "000". Therefore, a through-current flowing when an output is changed over with the output buffer is also reduced remarkably when the gray code is outputted than that which flows when the binary code is outputted.

Figure 6A:
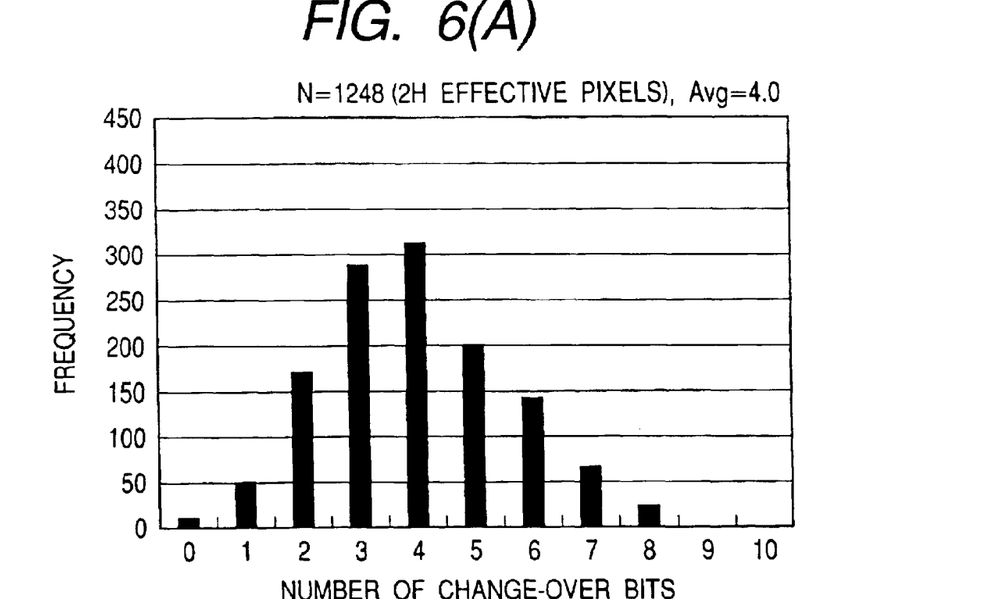
FIGS. 6A and 6B are graphs showing the frequency (number of times) of the number of change-over bits of the video data after the AD conversion in the existing imaging system and the frequency of the number of change-over bits of the video data after the AD conversion in the system to which the present invention is adapted.
Figure 6B:
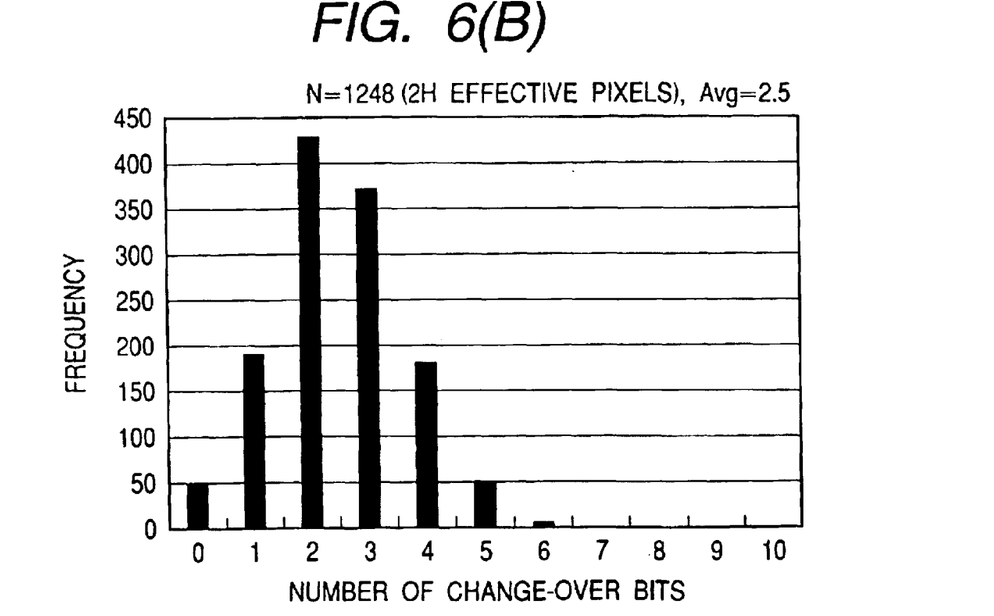

FIGS. 6(A) and 6(B) show graphs of the result (A) of search for the number of change-over bits of the code after the AD conversion by the prior art method when a palm of a man is imaged with the CCD and the result (B) of search for the number of change-over bits of the code when the code is converted to the gray code after the difference encoding through application of this embodiment.

From FIGS. 6(A) and 6(B), it can be understood that the number of change-over bits in this embodiment is less than that in the prior art method, because the number of bits in the highest appearing frequency is "4" when the number of change-over bits of the code is "8" at maximum in the prior art method, while the number of bits in the highest appearing frequency is "2" when the number of change-over bits is "6" at maximum in this embodiment. As explained above, when the number of change-over bits is small, a through-current flowing into the output buffer can be reduced when a code is outputted in accordance with the invention, and thereby the power supply noise and noise which is propagated through the substrate can also be reduced.

The difference encoding and gray code converting system shown in FIG. 2 can also be adapted to the case where a complementary color filter in which four colors of Cy (Cyane), Ye (Yellow), Mg (Magenta) and G (Green) are arranged (see FIG. 4(B)) is used and the case where a filter in which the three primary colors of R (Red), G (Green) and B (Blue) are arranged in a horizontal line is used. Even if the complementary color filter is used in above cases, when two kinds of color elements are alternately arranged in the same line, it is enough that the amount of delay in the delay circuit 41 is set to the two-clock period as explained above in regard to this embodiment.

On the other hand, when the three-primary-color filter in which three color elements are sequentially and repeatedly arranged in a horizontal line is used, it is enough that the amount of delay in the delay circuit 41 is set to the three-clock period. Since the amount of delay in the delay circuit 41 changes depending on the filter used, it is also possible that the delay circuit 41 of the embodiment shown in FIG. 2 is constructed by a variable delay circuit and a register for designating amount of delay (delay clock period) corresponding to such variable delay circuit in order to change the amount of delay in the delay circuit 41 through update of the preset value of this register.

Next, the second embodiment of the present invention will be explained. In this second embodiment, the code is not converted to the gray code after the difference encoding, unlike the first embodiment, and a fixed value expressed with a certain binary code is added (or subtracted) after the difference encoding. The code (hereinafter referred to as the offset binary code) of the case where "5 expressed with the decimal number ("101" in the binary code)" is added as the fixed value after the difference encoding is shown in the right side column of the Table 2.

When "5" is added as the fixed value after the difference encoding from the Table 2, the binary code is changed to "100" from "101" when the decimal number changes to "−1" from "0". Therefore, in this case, only one bit is changed over. However, in the case of this system, since the binary code changes to "000" from "111" when the decimal number changes to "3" from "2", the number of bits to be changed over becomes 3. However, the amount of change of the signals between the adjacent pixels enters the range from "−1" to "+2" in a certain input video signal, namely in a certain imaging object (a certain video signal has a small difference of luminosity). In this case, even when the second embodiment is adapted, the number of bits to be changed when an output is changed over can be reduced and noise resulting from the change of output can also be reduced.

In the Table 2, the code is composed of three bits and when the number of bits increases, the range of offset binary code in which the number of bits to be changed when the output data is changed over can be reduced to 1 or less can be widened by adequately selecting the fixed value to be added. Therefore, even when the code is converted to the offset binary code after the difference encoding, the number of bits to be changed when the output digital signal is changed over can be reduced considerably, although it is not so large as in the case of the first embodiment. Thereby, a through-current in the output circuit can be reduced and noise resulting from change of output can also be reduced.

Figure 7:
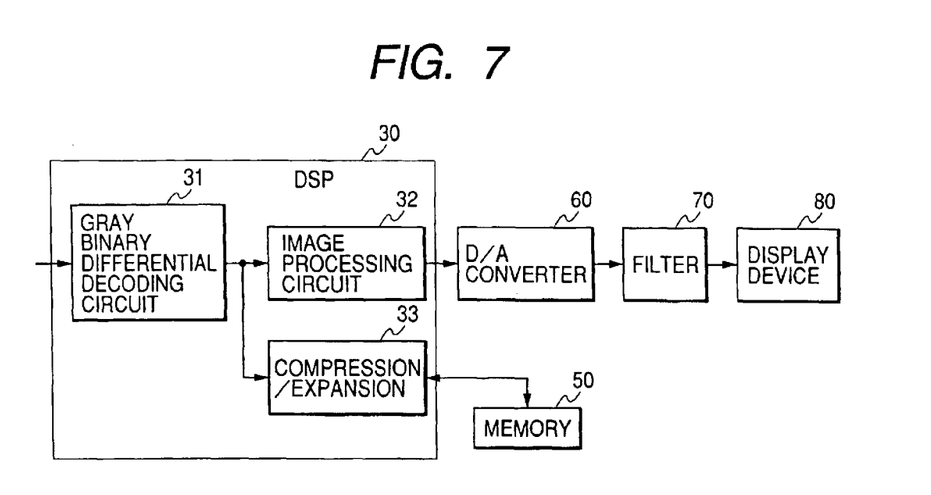
FIG. 7 is a block diagram showing an example of construction of a DSP for processing the video data after the AD conversion.

FIG. 7 shows a schematic construction of a DSP (Digital Signal Processor) 30 which executes the data process by receiving a video data outputted from the AD conversion LSI. The DSP 30 of this embodiment is composed of a gray binary difference decoding circuit 31 which receives the gray-code converted video data outputted from the AD conversion LSI for reverse conversion thereof to the original binary code and then executes the difference decoding, a video signal processing circuit 32 for executing the video process, for example, color compensation and mixing of video signals to the decoded video data and a compression/expansion circuit 33 for compressing the decoded video data to store it into an external memory 50 and expanding the video data read from the memory 50. As the memory 50, a non-volatile semiconductor memory such as RAM and a non-volatile memory such as smart media and compact flash may be used.

Here, it is also possible that the video data after the image process is compressed with the compression/expansion circuit 33 and thereafter the data is stored in the external memory 50, in place of compressing the video data before the image process in the video processing circuit 32. In this embodiment, the video data processed in the DSP 30 is then outputted to the external DA conversion circuit 60 and is converted to an analog signal. This analog signal is then supplied to a display 80 through a filter 70 for the purpose of display. The DSP 30 of FIG. 7 is indicated by the function block, and the actual hardware is constructed by an arithmetic circuit such as a multiplier or an adder, a register for holding data and a control circuit or the like for operating the above circuits in a predetermined sequence depending on the process contents.

Figure 8:
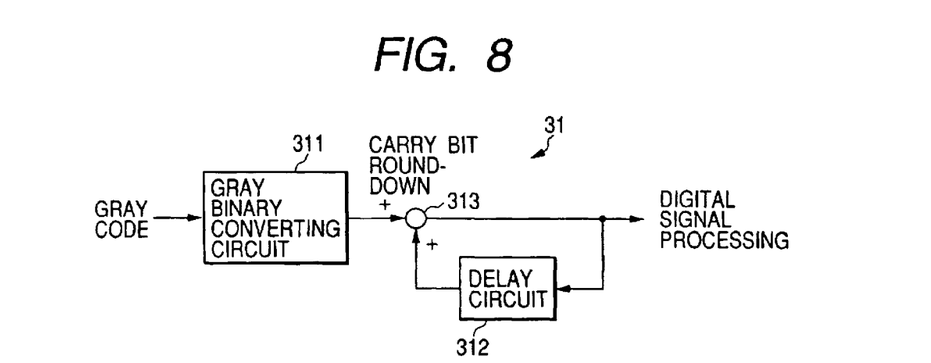
FIG. 8 is a block diagram showing an example of construction of the gray binary difference decoding circuit provided in the DSP.

FIG. 8 shows a construction of the gray binary difference decoding circuit 31 provided within the DSP 30. This gray binary difference decoding signal 31 is constructed by a gray binary conversion circuit 311 for converting the gray code indicated in the third column in the Table 2, for example, when the data is composed of three bits, to the binary code indicated in the second column, a delay circuit 312 for delaying the code signal as much as the predetermined clock period corresponding to the delay of the delay circuit 41 shown in FIG. 2 and an adder circuit 313 for generating the difference decoded data by adding the code delayed by the delay circuit 312 to the code converted by the gray binary conversion circuit 311. Here, the adder circuit 313 is constructed to round down a carry generated when addition is carried out. Even when the adder is constructed to conduct the round-down of carry when the difference decoding is conducted, the original code can be recovered accurately as explained with reference to the Table 1.

Figure 9:
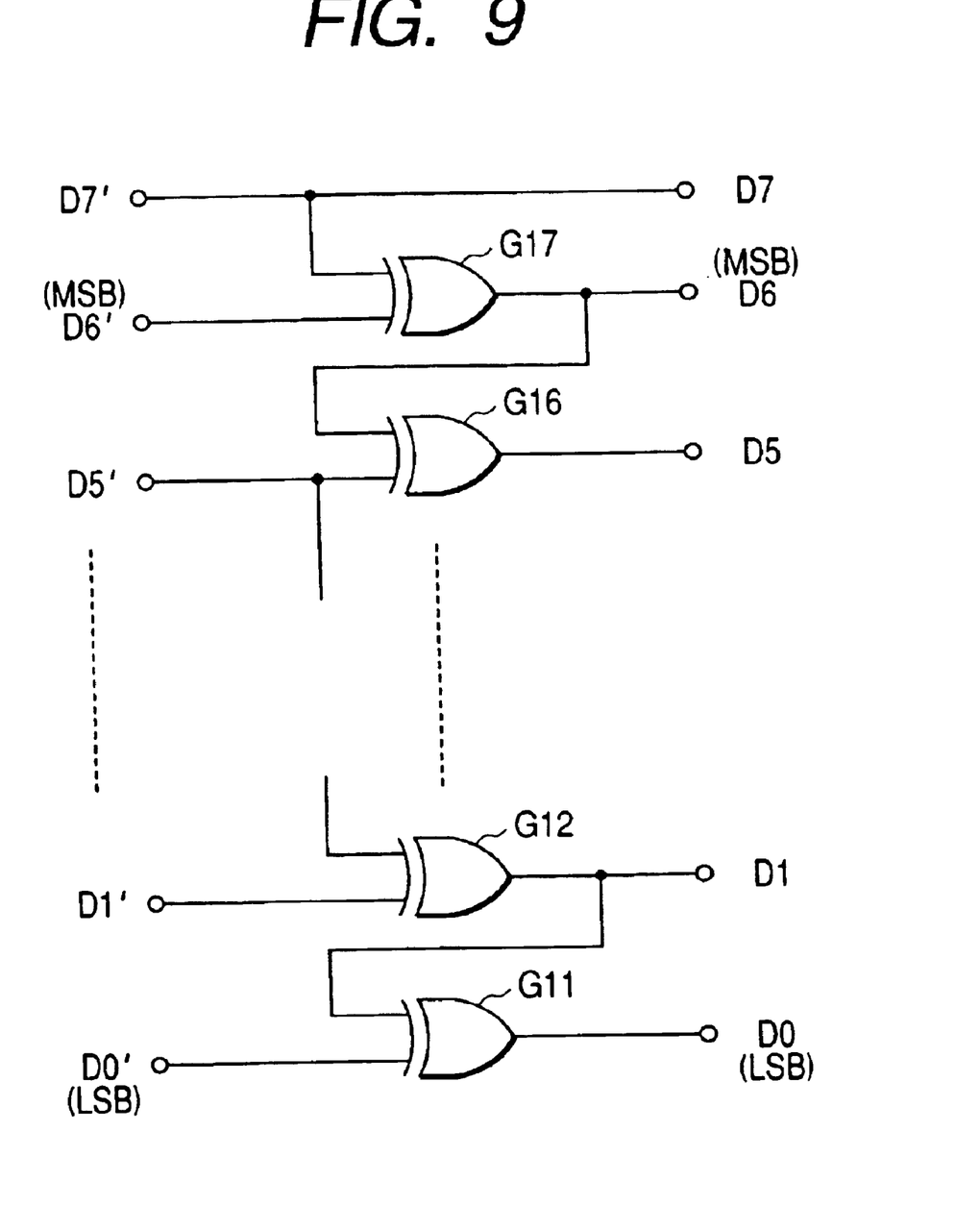
FIG. 9 is a block diagram showing an example of practical construction of the gray binary conversion circuit.

FIG. 9 shows an example of practical construction of the gray binary conversion circuit 311. As illustrated in this figure, the gray binary conversion circuit 311 is composed of the exclusive OR gates G11 to G17 of a number which is less by one than the number of bits to be converted. The code can be converted to the binary code with the exclusive OR of each input bit Di' except for the most significant bit and the bit (output of the exclusive OR gate) Di+1 after the conversion in the significant bit side which is higher by one level than such input bit. The most significant bit D7' is outputted directly as the most significant bit D7 after the conversion. FIG. 9 shows an example of the circuit for converting the gray code of 8 bits to the binary code corresponding to FIG. 3, and a code conversion circuit of the desired bits such as 10 bits and 12 bits can be constructed in the same manner.

FIG. 8 and FIG. 9 show examples of the conversion circuit when the code transmitted is the gray code. When the code transmitted is the offset binary code indicated in the fourth column of the Table 2, the circuit for subtracting (or adding) a fixed value from (or to) the input code is used.

The inventions realized by the inventors have been explained above practically based on the preferred embodiments thereof, but the present invention is not limited to above embodiments and may be changed or modified within the scope not departing from the subject matters described in the claims of the present invention. For example, in above embodiments, conversion to the gray code and conversion to the offset binary code have been described as the examples of code conversion which is executed after the difference encoding, but the code conversion is not limited thereto and any type of code conversion may be introduced when a less number of bits to be changed for change-over of the code indicating a difference are used.

Moreover, in above embodiments, an AD conversion LSI loading the CDS (correlated double sampling circuit) has been explained but the CDS may be omitted, and also may be constructed by another chip. In the embodiments, an AD conversion LSI employed in an imaging system using a CCD has been explained, but the present invention can also be adapted to an AD conversion LSI in an imaging system utilizing an imaging element other than a CCD, such as a CMOS image sensor.

In above explanation, the inventions which are mainly realized by the inventors of the present invention are adapted to the imaging system which is the application field of the background of the present invention. However, the present invention is not limited thereto and may be widely introduced, for example, to another system in which an analog signal is processed after conversion into digital data, such as a recording system to process an audio signal.

Typical effects of the present invention may be briefly explained below.

The image quality can be improved by lowering noise generated in the AD conversion LSI output circuit for converting an analog video signal outputted from an imaging element to a digital video data without reduction of the transfer rate of signals.

What is claimed is:

1. An imaging system comprising:
   an imaging element provided with a color filter;
   a first semiconductor integrated circuit device including:
   an amplifying circuit for amplifying an analog color video signal outputted from said imaging element, an AD conversion circuit for converting the amplified analog color video signal to a digital signal, a differential circuit for obtaining a difference between codes of adjacent pixels of the digital signal in regard to a same color after a conversion operation of the AD conversion circuit and before outputting to outside of the first semiconductor integrated circuit device, and a first code conversion circuit for code conversion of an output of the differential circuit;
   and a second semiconductor integrated circuit device including a second code conversion circuit for converting an output from the first semiconductor integrated circuit device.

2. An imaging system according to claim 1,
   wherein the first code conversion circuit is a binary to gray code conversion circuit for converting a binary code to a gray code;
   and the second code conversion circuit is a gray to binary code conversion circuit for converting the gray code to the binary code.

3. An imaging system according to claim 1,
   wherein said first code conversion circuit comprises a circuit for adding or subtracting a fixed value to or from an input code;
   and said second code conversion circuit comprises a circuit for subtracting or adding a fixed value from or to an input code.

4. An imaging system according to claim 1,
   wherein said differential circuit comprises a delay circuit for delaying an output code of said AD conversion circuit and a subtraction circuit for obtaining a difference between the output code delayed by the delay circuit and an input code,
   and said delay circuit is constructed to vary a delay time depending on a color arrangement of an input video signal.

5. An imaging system according to claim 1,
   wherein the imaging system includes a storage circuit to store digital video data,
   the second semiconductor integrated circuit device is provided with a data compression circuit for compressing an output converted by said second code conversion circuit and a data expanding circuit for expanding the output compressed by the data compression circuit,
   and codes compressed by the data compression circuit are stored in the storage circuit.

6. An imaging system according to claim 1,
   wherein the second semiconductor integrated circuit has an image processor for processing codes converted by the second conversion circuit.

7. An imaging system comprising:
   an imaging element provided with a color filter;
   a first semiconductor integrated circuit device including a correlation double sampling circuit for sampling an analog color video signal output from the imaging element, an amplifying circuit for amplifying the analog color video signal output from the correlation double sampling circuit, an AD conversion circuit for converting the analog color video signal amplified by the amplifying circuit to a digital signal, a differential circuit for obtaining a difference between codes of adjacent pixels of the digital data in regard to a same color, and a code conversion circuit for code conversion of an output of said differential circuit;
   and a second semiconductor integrated circuit device having a code converter for converting an output from the first semiconductor integrated circuit device and an image processor for processing codes converted by the code converter.

8. An imaging system according to claim 7,
   wherein the code conversion circuit is a binary to gray code conversion circuit for converting a binary code to a gray code,
   and the code converter is a gray to binary code conversion circuit for converting the gray code to the binary code.

9. An imaging system according to claim 7,
   wherein the code conversion circuit comprises a circuit for adding or subtracting a fixed value to or from an input code,
   and the code converter comprises a circuit for subtracting or adding a fixed value from or to an input code.

10. An imaging system according to claim 7,
    wherein said differential circuit comprises a delay circuit for delaying an output code of said AD conversion circuit and a subtraction circuit for obtaining a difference between the output code delayed by the delay circuit and an input code,
    and said delay circuit is constructed to vary a delay time depending on a color arrangement of an input video signal.

11. An imaging system according to claim 7,
    wherein the imaging system includes a storage circuit to store a digital video data,
    the second semiconductor integrated circuit device is provided with a data compression circuit for compressing an output converted by the code converter, and a data expanding circuit for expanding the output compressed by the data compression circuit,
    and codes compressed by said data compression circuit are stored in the storage circuit.

12. An imaging system according to claim 7,
    wherein a sampling period of said correlation double sampling circuit corresponds to a color arrangement of the analog color video signal output from the image element.

13. An imaging system according to claim 12,
    wherein said differential circuit comprises a circuit to set sampling time of said correlation double sampling circuit.

14. An imaging system according to claim 13,
    wherein the circuit comprises a register for setting the time.

15. An imaging system according to claim 13, wherein the time corresponds to the color filter.

16. An imaging system comprising:

an imaging element provided with a color filter;

a first semiconductor integrated circuit device including a correlation double sampling circuit for sampling an analog color video signal output from the imaging element, an AD conversion circuit for converting the analog color video signal output from the correlation double sampling circuit to a digital signal, a differential circuit for obtaining a difference between codes of adjacent pixels of the digital signal in regard to a same color, and a code conversion circuit for code conversion of an output of said differential circuit;

and a second semiconductor integrated circuit device having a code converter for converting an output from the first semiconductor integrated circuit device.

17. An imaging system according to claim 16, wherein the time corresponds to the color filter.

18. An imaging system according to claim 16, wherein a sampling period of said correlation double sampling circuit corresponds to a color arrangement of the analog color video signal output from the image element.

19. An imaging system according to claim 18, wherein said differential circuit comprises a circuit to set sampling time of said correlation double sampling circuit.

20. An imaging system according to claim 19, wherein the circuit comprises a register for setting the time.

* * * * *